United States Patent
Bruza et al.

(10) Patent No.: US 10,353,491 B2
(45) Date of Patent: Jul. 16, 2019

(54) SYSTEM AND METHOD FOR MOTION PROCESSING IN MOBILE DEVICES

(71) Applicant: Outlyer, LLC, Valencia, CA (US)

(72) Inventors: Robert P. Bruza, Valencia, CA (US); Samuel R. Vidal, Valencia, CA (US)

(73) Assignee: Outlyer, LLC, Valencia, CA (US)

( * ) Notice: Subject to any disclaimer, the term of this patent is extended or adjusted under 35 U.S.C. 154(b) by 129 days.

(21) Appl. No.: 15/433,014

(22) Filed: Feb. 15, 2017

(65) Prior Publication Data

US 2017/0235382 A1 Aug. 17, 2017

Related U.S. Application Data

(60) Provisional application No. 62/296,313, filed on Feb. 17, 2016.

(51) Int. Cl.
*G06F 3/01* (2006.01)
*G06F 3/0346* (2013.01)

(52) U.S. Cl.
CPC ............ *G06F 3/0346* (2013.01); *G06F 3/012* (2013.01)

(58) Field of Classification Search
CPC combination set(s) only.
See application file for complete search history.

(56) References Cited

U.S. PATENT DOCUMENTS

| | | | |
|---|---|---|---|
| 8,957,835 B2 | 2/2015 | Hoellwarth | |
| 9,482,869 B2 | 11/2016 | Hoellwarth | |
| 9,551,873 B2 | 1/2017 | Zalewski | |
| 2009/0179854 A1* | 7/2009 | Weber | G06F 1/1626 345/156 |
| 2011/0006977 A1* | 1/2011 | Khosravy | G06F 3/017 345/156 |
| 2011/0010676 A1* | 1/2011 | Khosravy | G01C 21/3605 715/863 |
| 2015/0234193 A1 | 8/2015 | Lyons | |
| 2015/0253574 A1 | 9/2015 | Thurber | |
| 2015/0364113 A1 | 12/2015 | Ahn et al. | |

FOREIGN PATENT DOCUMENTS

| | | |
|---|---|---|
| WO | 2012008133 A1 | 1/2012 |
| WO | 2015131648 A1 | 9/2015 |

* cited by examiner

*Primary Examiner* — Van N Chow
(74) *Attorney, Agent, or Firm* — Price Heneveld LLP

(57) ABSTRACT

A mobile device is disclosed. The mobile device comprises an inertial measurement unit (IMU), a magnetic field detector, a display screen, and a processing unit. The processing unit is operable to monitor directional data from the magnetic field detector. In response to directional data exceeding a predetermined threshold, the processing unit processes the graphic content based on the inertial motion data from the IMU. The controller then displays the graphic content on the display screen demonstrating graphic motion corresponding to the inertial motion data.

16 Claims, 4 Drawing Sheets

SYSTEM AND METHOD FOR MOTION PROCESSING IN MOBILE DEVICES

CROSS-REFERENCE TO RELATED APPLICATION

This application claims benefit to U.S. Provisional Application No. 62/296,313, filed on Feb. 17, 2016, entitled "SYSTEM AND METHOD FOR MOTION PROCESSING IN MOBILE DEVICES," the disclosure of which is hereby incorporated herein by reference in its entirety.

TECHNOLOGICAL FIELD

The present invention generally relates to processing motion data and more particularly to rendering graphic content in mobile devices based on motion data.

BRIEF SUMMARY OF THE INVENTION

In one aspect of the disclosure, a mobile device is disclosed. The mobile device comprises an inertial measurement unit, a magnetic field detector, and a display screen. The inertial measurement unit (IMU) is configured to measure inertial motion data and the magnetic field detector is configured to measure directional data. The display screen is configured to display graphic content. The mobile device further comprises a processing unit communicatively coupled to the IMU, the magnetic field detector, and the display screen. The processing unit is configured to monitor the directional data. In response to directional data exceeding a predetermined threshold, the processing unit is configured process the graphic content based on the inertial motion data. The processing unit is further configured to display the graphic content on the display screen demonstrating a graphic motion controlled based on the inertial motion data.

In another aspect of the disclosure, a method for controlling three dimensional manipulation of graphic content for a mobile device is disclosed. The method comprises receiving inertial motion data from an inertial measurement unit (IMU) and receiving directional data from a magnetic field detector. The method further comprises controlling a first motion of a first graphic content based on the inertial motion data and controlling a second motion of a second content based on the directional data. The first graphic content and the second graphic content is integrated to form integrated content and displayed on a display screen demonstrating the first motion and the second motion.

In yet another aspect of the disclosure, a mobile device is disclosed. The mobile device comprises an inertial measurement unit (IMU) configured to measure inertial motion data and a display screen configured to receive a user input as user motion and display graphic content. A processing unit is communicatively coupled to the IMU and the display screen. The processing unit is configured to monitor the directional data and selectively control a motion of the graphic content based on a priority. The priority comprises first controlling a manipulation of the graphic content in response to the user motion and second controlling the manipulation of the graphic content in response to the inertial motion data. The processing unit is further configured to display the graphic content on the display screen demonstrating the manipulation as graphic motion.

These and other features, advantages, and objects of the present invention will be further understood and appreciated by those skilled in the art by reference to the following specification, claims, and appended drawings.

DETAILED DESCRIPTION

For purposes of description herein, it is also to be understood that the specific devices and processes illustrated in the attached drawings, and described in the following specification are simply exemplary embodiments of the inventive concepts defined in the appended claims. Hence, specific devices and/or characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1A:
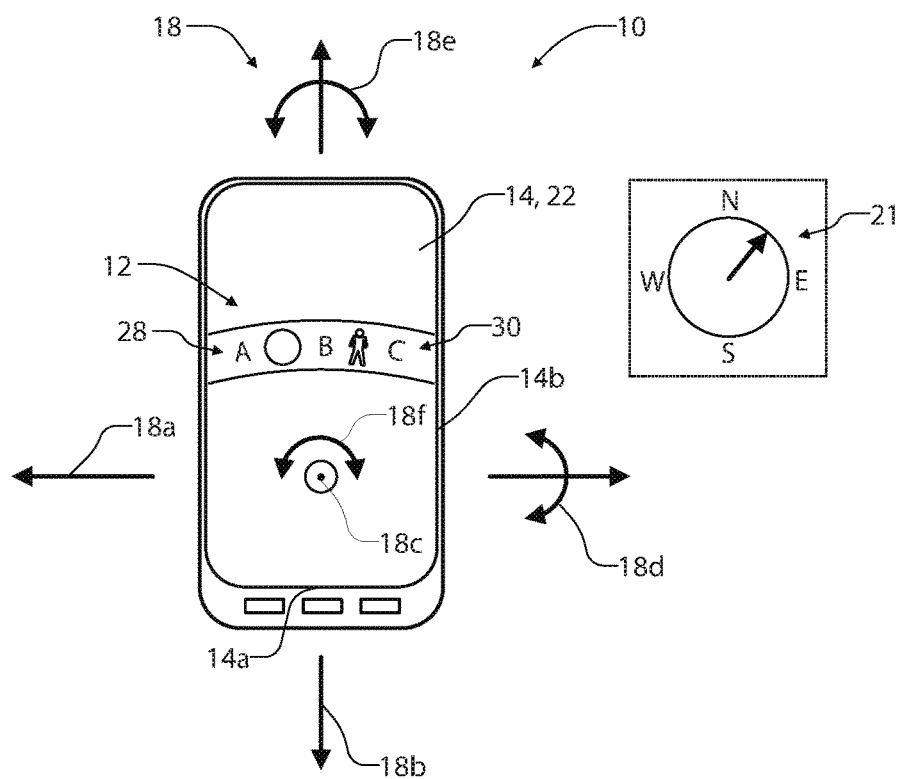
FIG. 1A is a schematic diagram of a mobile device configured to utilize sensor data to control graphic content.

Referring to FIG. 1, a schematic diagram of a mobile device 10 is shown. The mobile device 10 may be configured to utilize sensor data to access and control graphic content 12. The sensor data may be detected by one of more sensors in communication with the mobile device 10. In some embodiments, the one or more sensors may be operable to detect motion data identifying the orientation and/or movement of the mobile device 10 and communicate the motion data to a processing unit of the mobile device 10. In this configuration, the mobile device 10 may be operable to control the graphic content 12 in response to the orientation and/or movement of the mobile device 10 and output the graphic content 12 for display on a screen 14 of the device 10.

In some systems, processing motion data may require a design tradeoff. That is, providing smooth rendering and control of the graphic content 12 may typically require increased resources, which may include increased processing, memory, signal filtering, power and various related hardware requirements of the mobile device 10. Such increased resources typically require increased cost and/or size of the mobile device. Accordingly, it is advantageous to provide for systems and methods operable to generate smooth control of graphic content 12 while limiting resource requirements. The disclosure provides for various exemplary embodiments of systems that may be operable to measure motion data to provide for smooth intuitive control of the graphic content 12.

Figure 4:
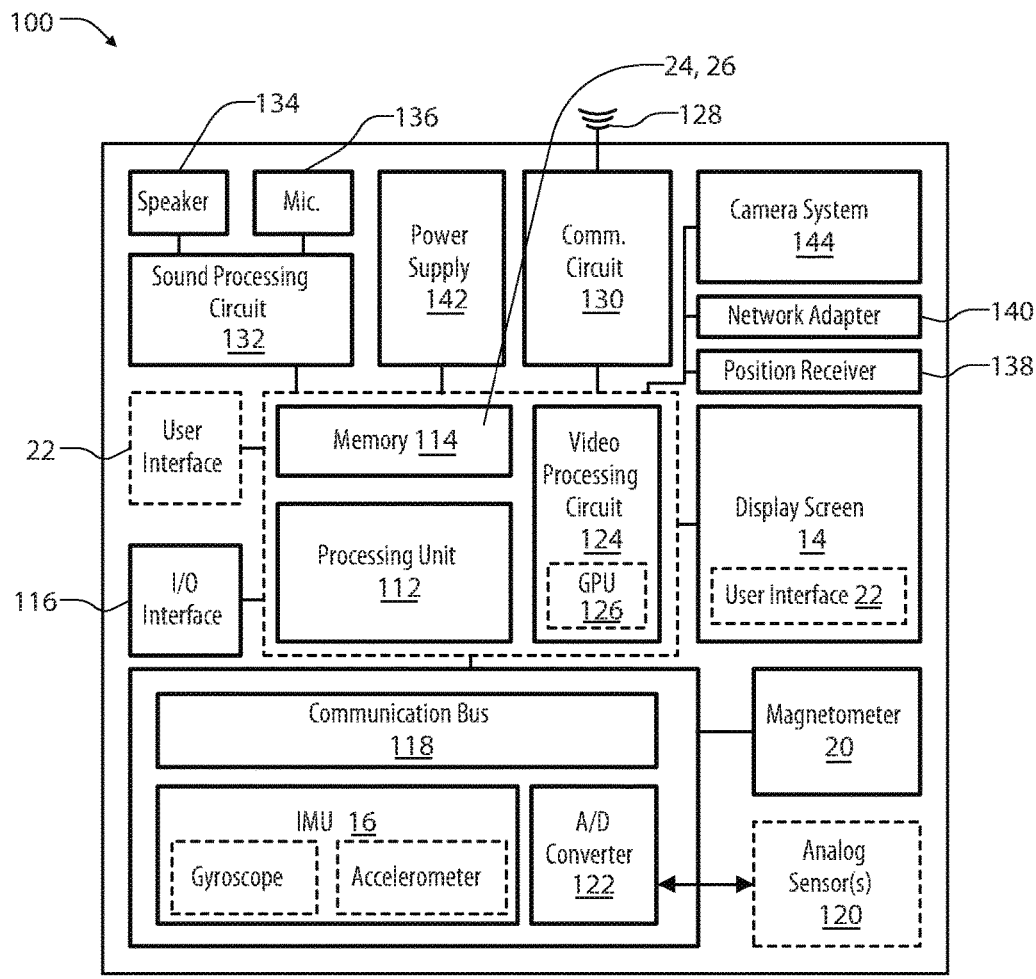
FIG. 4 is a block diagram of an exemplary mobile device configured to utilize sensor data to control graphic content.

The sensor data described herein may correspond to inertial and/or directional data. In some embodiments, the inertial data may be received by the processing unit from one or more inertial sensors or an inertial measurement unit 16 (IMU) (FIG. 4). The IMU 16 may correspond to one or more sensors configured to detect movement of the mobile device 10. For example, the IMU 16 may include an accelerometer, a gyroscope, or other suitable device for measuring an inertial state of the mobile device 10. As non-limiting examples, inertial sensors may correspond to accelerometers and/or gyroscopes based on Micro-Electro-Mechanical Systems (MEMS) technology, Fiber Optic Gyros (FOG), and/or Ring Laser Gyros (RLG). Some exemplary devices that may be suitable for at least some applications as discussed herein may include devices from a variety of manufacturers including: ANALOG DEVICES, Inc.; STMICROELECTRONICS, N.V.; INVENSENSE, Inc.; KIONIX, Inc.; MURATA, Ltd.; BOSCH, Ltd.; HONEYWELL, Inc.; NORTHRUP GRUMMAN, Inc.; and IMAR, GmbH. It will be appreciated that inertial sensors may vary in quality, grade, performance, and/or durability across manufacturers and products lines.

In some embodiments, the IMU 16 of the mobile device 10 may include a plurality of inertial sensors configured to measure one or more inertial states of the mobile device 10 along a plurality of different coordinate axes 18. The coordinate axis may include a first axis 18*a*, a second axis 18*b*, and a third axis 18*c*. The IMU 16 may further be configured to measure the inertial state about each of the axes 18. For example, the IMU 16 may be configured to measure a first axis rotation 18*d*, a second axis rotation 18*e*, and a third axis rotation 18*f*. In this configuration, the IMU 16 may be operable to measure and communicate a direction and magnitude of movement along and/or about each of the axes 18 and communicate such information to the processing unit of the mobile device 10.

In some embodiments, the sensor data described herein may correspond to heading data or directional data. The directional data may include measurements obtained from a magnetometer 20 or magnetic field detector (FIG. 4). The magnetometer 20 may correspond to one or more magnetometers. Magnetometers may be configured to detect magnetic fields and may be utilized to orient the mobile device 10 to provide a bearing or azimuthal direction 21 of a magnetic pole relative to the mobile device 10. In this configuration, magnetometer 20 may be operable to measure the azimuthal direction of the mobile device 10 and communicate the directional data to the processing unit.

The screen 14 may further correspond to a user interface 22. The screen 14 may correspond to a cathode ray tube (CRT), liquid crystal display (LCD), plasma, light emitting diode (LED), etc. The screen 14 may be configured to display various forms of graphic content such as alphanumeric characters, icons, cursor, pictures, graphics, drawings, etc. The screen 14 may provide for the user interface 22 by communicating a location of an input relative to a first dimension 14*a* and a second dimension 14*b* via a touch sensor. The touch sensor may be implemented using a variety of sensory technologies including, but not limited to resistive, capacitive, surface acoustic wave, etc. In this configuration, the processing unit may further be operable to detect an input in to the screen, which may correspond to one or more movements. The one or more movements may correspond to a directional or multidirectional (e.g. a pinch or rotation) movement across one or more of the dimensions 14*a* and 14*b*.

As discussed previously, the mobile device 10 may be operable to control the graphic content 12 in response to the orientation and/or movement of the mobile device 10. Graphic content as referred to herein may correspond to any form of graphics, characters, symbols, images, etc. that may be displayed on the screen 14 of the mobile device 10. The processing unit may be configured to access the graphic content via one or more graphic libraries. As will be discussed further herein, the disclosure provides for a system and method configured to improve processing of the graphic content by the processor while limiting processing requirements for the processing unit.

In some embodiments, the mobile device 10 may be configured to access the graphic content 12 from a first graphic library 24 and a second graphic library 26. The first graphic library 24 and the second graphic library 26 are shown in reference to FIG. 4. Each of the graphic libraries may correspond to application programming interfaces (APIs) or other programming interfaces. An API may express a software component in terms of its operations, inputs, outputs, and underlying types, defining functionalities that are independent of their respective implementations. Accordingly, an API may provide for an interface utilized to access the building blocks and provide instructions for the graphic content 12 as discussed herein. The APIs may be utilized in a web-based system, operating system, or database system of the mobile device 10, and may provide for the processing unit to manipulate the graphic content 12 as shown on the screen 14 in response to the sensor data as discussed herein.

The graphic libraries may be stored in a memory in communication with the processing unit of the mobile device 10. In this configuration, the processing unit and/or a graphics processing unit of the mobile device 10 may be configured to access the one or more graphic libraries to control the graphic content 12 in response to the motion data. As discussed further in reference to the methods described in reference to FIGS. 2 and 3, in some embodiments, the mobile device 10 may be configured to utilize the sensor data from each of the IMU 16 and the magnetometer 20 to control use of the motion data and provide for smooth rendering of the graphic content 12 for display on the screen 14.

The first graphic library 24 may correspond to an API for rendering interactive three-dimensional (3D) computer graphics and two-dimensional (2D graphics). The first graphic library 24 may be completely or partially integrated to provide for accelerated graphics processing and usage of physics and image processing as part of a web page canvas. For example, the first graphic library 24 may correspond to a 3D graphic library comprising content that is static in three dimensional appearance. The first graphic library 24 may comprise one of the following libraries: 2D Canvas, WebGL™, SVG™, 3D CSS Transforms™, and SMIL™. The processing unit may access the first graphic library 24 and manipulate the corresponding graphic content via the inertial data received from the IMU 16. In this configuration, the processing unit may be operable to generate a first portion 28 of the graphic content 12 providing for 3D effects based on the first graphic library 24.

The second graphic library 26 may correspond to an API for rendering interactive 2D graphics or 3D graphics, which may be configurable in appearance. For example, the second graphic library may comprise graphic content that may be rendered in response to an instruction received by the mobile device 10. In some embodiments, the second graphic library 26 may correspond to a markup language used to create simple programs (e.g. webpages etc.). The second graphic library 26 may correspond to various forms of APIs which may be utilized to provide for various building blocks of the graphic content 12. For example, the second graphic library may be configured to provide structured documents such as headings, paragraphs, lists, links, image data, quotes and other items. Accordingly, the second graphic library 26 may correspond to one or more markup languages, for example, Cascading Style Sheets (CSS), and JavaScript, and HTML. As discussed further in reference to FIGS. 2 and 3, the processing unit may be configured to convert the inertial data received from the IMU 16 to translational data to generate a second portion 30 of the graphic content 12 providing for 2D graphics based on the second graphic library 26.

As discussed herein, the mobile device 10 may be operable to render and/or manipulate the first portion 28 and the second portion 30 to generate the graphic content 12. The processing unit of the mobile device 10 may be operable to render and/or manipulate the first portion 28 and the second portion 30 based on the inertial data from the IMU 16 and may further be operable to improve an accuracy of the inertial data based at least in part on the directional data received from the magnetometer 20. In this way, the mobile device 10 may provide for an improved system and method for display of the graphic content 12 based on the sensor data recorded by the IMU 16 and the magnetometer 20.

Figure 1B:
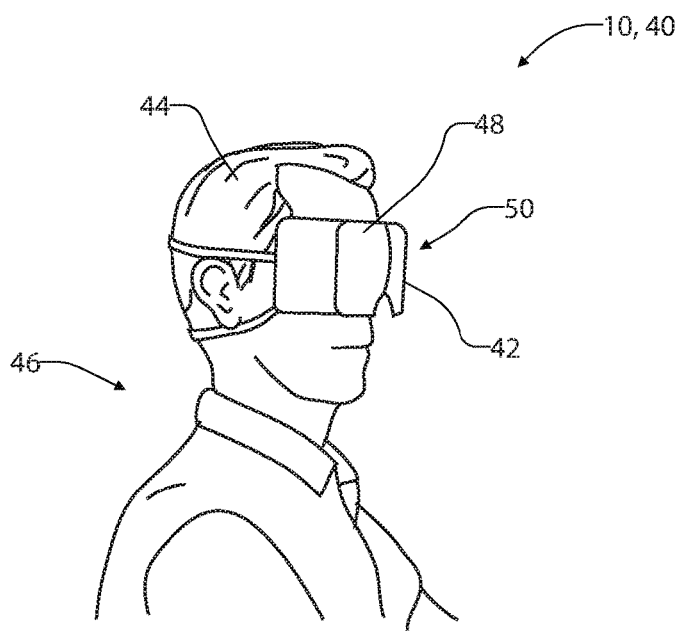
FIG. 1B is a schematic diagram of a head mounted device, which may correspond to the mobile device.

Referring now to FIG. 1B, in some embodiments, the mobile device 10 may correspond to and/or be utilized as a wearable or a head-mounted device 40. The mobile device 10 may be housed in a frame 42, which may be affixed to a head 44 of a user 46 of the head mounted device 40. In various configurations, the mobile device 10 may be permanently integrated as a portion of the head mounted device 40 or temporarily coupled to a mounting adaptor 48. For example, the mounting adaptor 48 may comprise the frame 42, which may be configured to temporarily couple the mobile device 10. Accordingly, the disclosure provides for various embodiments, which may include the head-mounted device 40 with the mobile device 10 permanently incorporated or temporarily coupled thereto via the mounting adaptor 48.

When utilized as the head mounted device 40, the inertial data from the IMU 16 and the directional data from the magnetometer 20 may be configured to measure the direction and orientation of the head 44 of the user 46. The movement of the axes 18 measured by the IMU 16 and the direction 21 of the magnetometer 20 may measure the movement and direction of the head 44 of the user. In this configuration, the mobile device 10 may provide for a virtual reality (VR) apparatus 50.

The mobile device 10 may correspond to a wide variety of electronic devices. For example, the mobile device 10 may be configured to provide specific features and/or applications for use by a user. The mobile device 10 may correspond to a handheld electronic device such as a portable media player, cellular telephone, internet-capable device, a personal digital assistant ("PDA"), a smartphone, tablet, or any other portable electronic device, or combination thereof. In some embodiments, the mobile device 10 may correspond to a headset, which may correspond to head-mounted electronic device, such as a VR headset.

Figure 2:
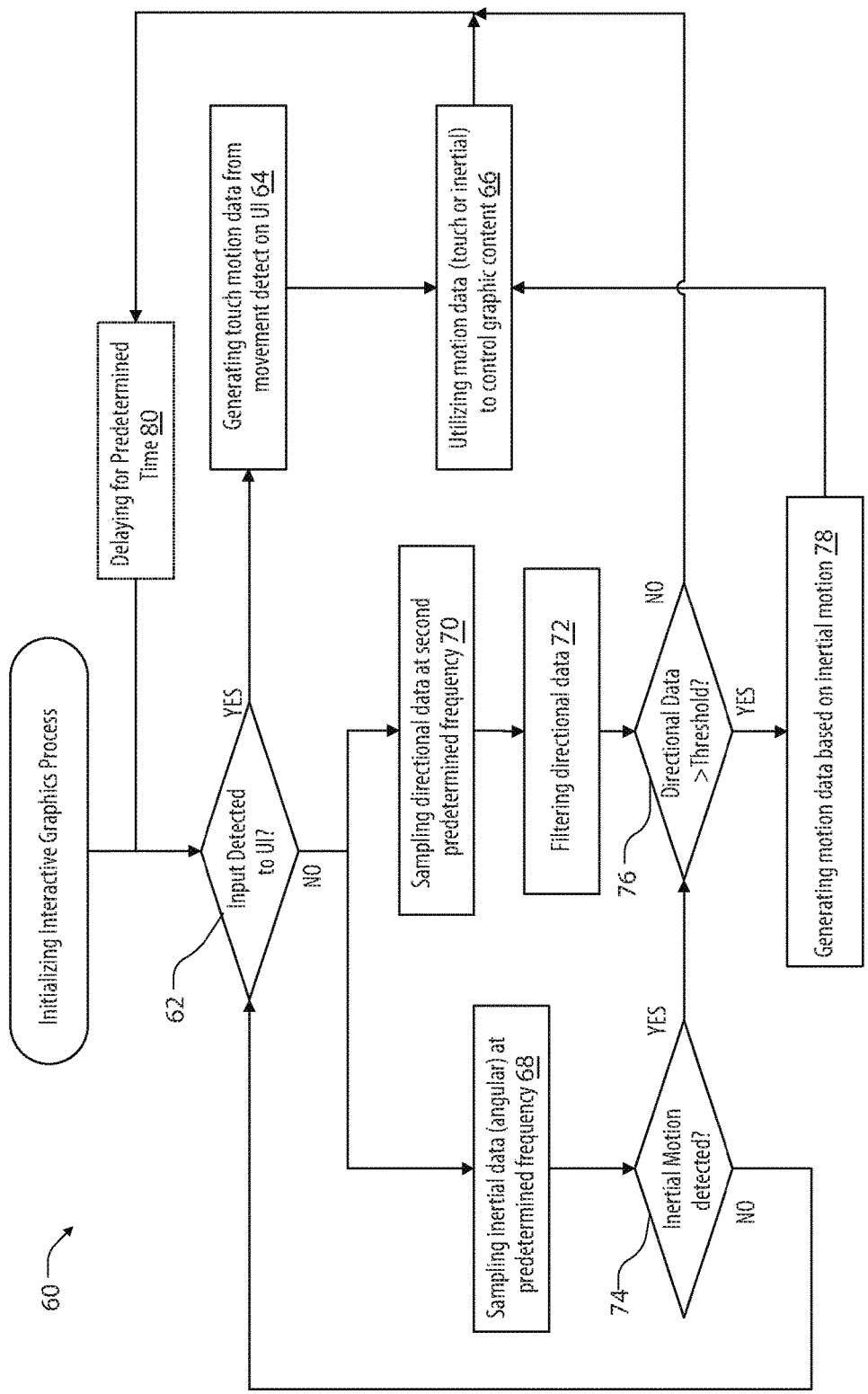
FIG. 2 is a flow chart demonstrating an exemplary method of processing sensor data to control graphic content.

Referring now to FIG. 2, a flow chart for an exemplary embodiment of a method 60 for using motion data to generate and display graphic content is shown. The method 60 may begin by loading the graphic content 12 on the screen 14. As discussed previously, the graphic content 12 may be generated by the processing unit from each of the first graphic library 24 and the second graphic library 26. The processing unit may load the graphic content 12 in response to a program, graphical user interface (GUI), and/or web-based media content being requested by the user or one or more programs for display on the screen 14. Once displayed, the graphic content 12 may correspond to interactive content that may be manipulated by the processing unit in response to the sensor data received by the IMU 16 and the magnetometer 20 and/or one or more inputs to the user interface 22 (e.g. the screen 14).

Once the graphic content is displayed on the screen, the processing unit may monitor the user interface 22 to identify if an input is detected (62). If an input is detected, the processing unit may generate motion data based on a motion of the input relative to the first axis 14a and the second axis 14b of the screen 14 (64). For clarity, motion data corresponding to the user interface 22 may be referred to as touch motion, user motion or user interface motion. The processing unit may then utilize the motion data from the touch motion or user motion to control or manipulate the graphic content 12 (66).

In some embodiments, if the touch motion is identified at the same time as inertial data from the IMU 16 and/or the directional data from the magnetometer 20, the processing unit may prioritize the calculation and control of the graphic content in response to the touch motion or user motion received from the user interface 22. In such implementations, the user motion received from the user interface is prioritized over the inertial motion data and/or the directional data to prioritize the control or manipulation of the graphic content during a temporal period. The prioritization may comprise controlling the graphic motion of the graphic content in response to only the user motion during the temporal period. Similarly the prioritization may comprise suppressing the control of the graphic motion of the graphic data due to the inertial motion data during the temporal period. In this way, the method 60 may provide for the selective control and prioritization of the control of the graphic motion.

If an input is not detected in step 62, the processing unit may sample inertial data from the IMU 16 at a first predetermined frequency (68). Additionally, the processing unit may sample directional data or magnetic field data from the magnetometer at a second predetermined frequency (70). The processing unit may also filter the directional data from the magnetometer 20 to limit high frequency noise (72). The processing unit may limit the noise in the directional data by rounding the directional data. In an exemplary embodiment, the directional data may be rounded to a significant digit of a numeric value, for example one degree. In some embodiments, the significant digit for rounding may correspond to a tenth of a degree, a hundredth of a degree, etc. depending mostly on a desired sensitivity and a particular hardware implementation of the magnetometer 20.

The first predetermined frequency may be approximately less than 20 msec. In an exemplary embodiment, the first predetermined frequency may range from approximately 1 msec. to 30 msec. The first predetermined frequency may be substantially based on a desired refresh rate of the inertial data. The second predetermined frequency may be greater than the first predetermined frequency. The second predetermined may range from approximately 5 msec. to 200 msec. and in an exemplary embodiment may be approximately 100 msec. In this configuration, the processing unit may sample the inertial data and the directional data to identify motion data or sensor data as discussed herein.

In some embodiments, the processing unit may be configured to monitor the inertial data to detect motion (74). If the processing unit detects movement or a change in the inertial data, the processing unit may continue to step 76. If the processing unit does not detect movement or a change in the inertial data, the processing unit may return to step 62. In step 76, the processing unit may further monitor the filtered directional data from step 72. The filtered directional data may be compared to a predetermined threshold to identify if the compass data corroborates the movement detected by the IMU 16 (76).

By returning to step 62 from step 76, the processing unit may suppress the control of the motion data generated based on the inertial data and/or the directional data. For example, the suppression may provide for the graphic content to substantially free from adjustment due to inertial data and/or the directional data to serve as a filter to prevent jerky or overly sensitive motion. Accordingly, the suppression of the motion data derived from the inertial data and/or the directional data may occur unless the processor identifies that the directional data exceeds the threshold in step 76.

If a change in the filtered directional data exceeds the predetermined threshold, the processing unit may generate motion data based from the inertial motion data (78). Once the motion data is generated based on the inertial motion data, the processing unit may continue to step 66 to utilize the inertial motion data as the motion data to control the graphic content 12. If the processing unit determines that the directional data does not exceed the predetermined threshold, the processing unit may continue to delay the method 60 for a predetermined period of time (80). For example, the predetermined period of time may correspond to 1 msec, 10 msec. etc. After step 80, the processing unit may return to step 62.

The predetermined threshold of the directional data may correspond to 1 degree, and in some embodiments may be approximately a tenth of a degree, one hundredth, etc. In some embodiments, the predetermined threshold may correspond to any directional motion detected and may relate to the filtering of step 70. For example, the filtered frequency or significant digit of the filter step 72 may provide for the directional data to only register a change in response to the predetermined threshold begin exceeded. In this way, the method 60 may provide for flexible operation and manipulation of the sensor data.

The predetermined time threshold may provide for a delay between an input to the user interface 22 and the generation of motion data from the IMU 16. Accordingly, the predetermined time may vary based on a response time, system capacity (e.g. processing speed of the processing unit) and/or a delay preference. Accordingly, the method may be applied in various environments to control the generation and manipulation of the graphic content 12.

Figure 3:
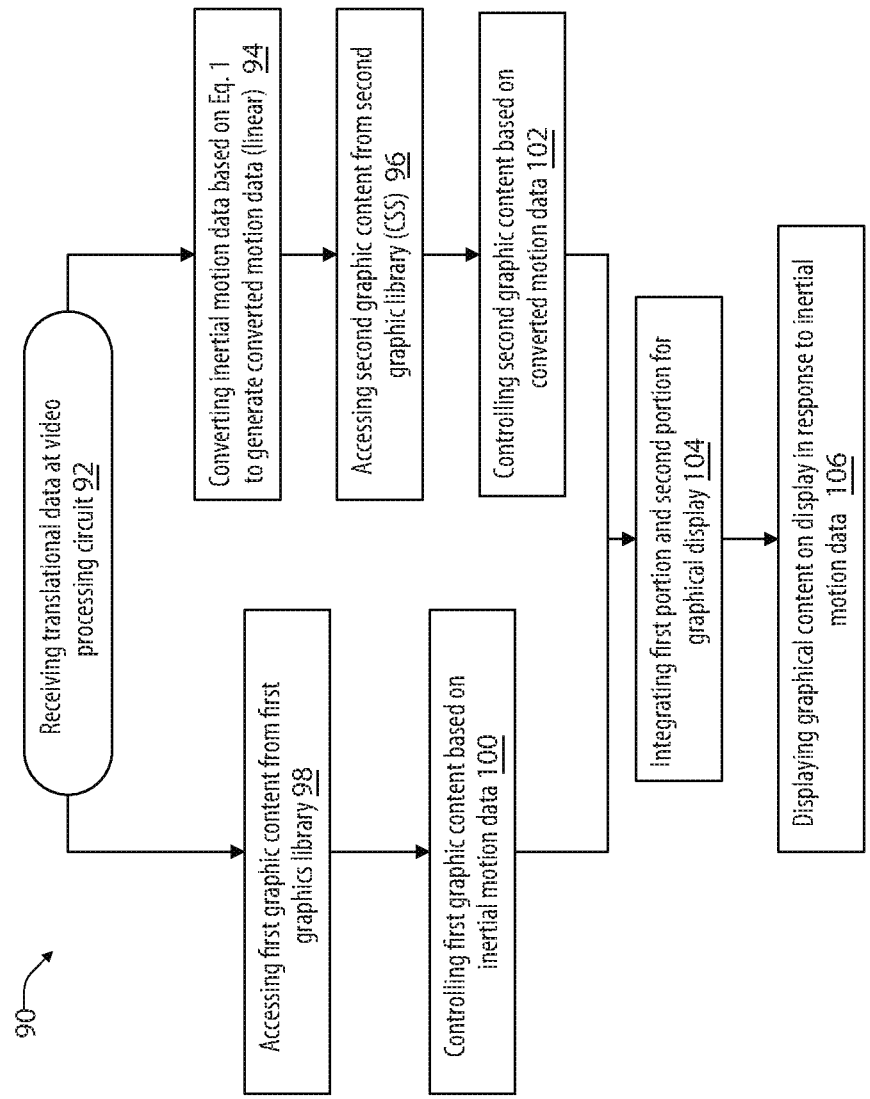
FIG. 3 is a flow chart demonstrating an exemplary method for utilizing sensor data to generate graphic content from a plurality of graphic libraries.

Referring now to FIG. 3, a flow chart for an exemplary embodiment of a method 90 for using motion data to generate and display graphic content is shown. The method 90 may utilize the motion data as described in reference to step 78 in the form of inertial motion data. As previously discussed, the processing unit may be operable to access the first graphic library 24 and the second graphic library 26 and manipulate the graphic content in response to the inertial motion data. However, the second graphic library 26 may be inoperable to process the inertial motion data in a native state (e.g. angular data).

The method 90 may begin in response to receiving inertial motion data at the video processing circuit of the mobile device 10, which may incorporate a graphic processing unit (92). Further details regarding an exemplary embodiment of the mobile device 10 are discussed in reference to FIG. 4. The inertial motion data may be accessed by the processing unit as angular data corresponding to the angular movement of the mobile device about each of the axes 18 ($\theta_x$, $\theta_y$, $\theta_z$). Accordingly, the processing unit may manipulate the inertial motion data by applying equation 1 to each of the axial values denoting the first axis rotation 18d, the second axis rotation 18e, and the third axis rotation 18f. In this way, the processing unit may generate linear motion data based on the angular information communicated as the inertial motion data, $M_s$ (e.g. $M_{sx}$, $M_{sy}$, and $M_{sz}$) (94).

$$M_{s_{x,y,z}} = \frac{FOV * \theta_{x,y,z}}{size} \qquad \text{(eq. 1)}$$

From equation 1, the converted motion about in each of the axes 18 is determined as the size of a field of view (FOV) of the graphic content 12 times the inertial motion about each of the axes 18 in degrees ($\theta_x$, $\theta_y$, $\theta_z$). The numerator of equation 1 is divided by the size of an object for display in the second portion 30 of the graphic content 12. The size of the object may be in pixels and may be based on the resolution of the object in the second graphic library 26. Once converted to the simplified motion data, the processing unit may access the second portion 30 of the graphic content 12 (96). The processor may also access the first portion 28 of the graphic content 12 from the first graphic library 24 (98).

Once the processing unit has accessed the first portion 28 of the graphic content 12, the corresponding graphical information may be controlled or manipulated by the processing unit (100). For example, the processing unit may utilize the inertial motion data to generate physics and image processing effects for a canvas element of the first portion. Similarly once the processing unit has accessed the second portion 30 of the graphic content 12, the corresponding graphical or content information may be controlled or manipulated by the processing unit (102). For example, the processing unit may utilize the converted motion data from equation 1 to generate structured documents such as headings, paragraphs, lists, links, image data, quotes and other items for the graphic content 12.

With the first portion 28 and the second portion 30, the processing unit may continue to integrate the graphic content 12 (104). The processing unit may then display the graphic content 12 from the first graphic library 24 and the second graphic library 26 as a single cohesive graphic display that may be manipulated in response to the inertial motion data and the converted motion data concurrently (106). In this way, the mobile device 10 may utilize the inertial data to control the graphic content 12 for display on the screen 14. Additionally, by utilizing the first graphic library 24 for substantially 3D content and the second graphic library 26 for structured documents and substantially 2D content, the method 90 may provide for efficient processing of the graphic content 12.

Referring now to FIG. 4, a block diagram of an exemplary embodiment of the mobile device 10 is shown. The mobile device 10 may comprise a processing unit 112, a memory 114, an input/output (I/O) interface 116, and a communication bus 118. The communication bus 118 may comprise one or more circuits configured to communicate and/or convert the sensor data from the IMU 16 and the magnetometer 20 to the processing unit 112. The mobile device 10 may further comprise one or more analog sensors 120 that may be in communication with the communication bus 118 via an analog-to-digital converter (ADC) 122, which may supply sensor data in digital form to the communication bus 118.

The processing unit 112 may correspond to one or more microprocessors, central processing units (CPUs), or other processors which run software programs for the mobile device 10 or for other applications related to the functionality of mobile device 10. For example, different software application programs such as menu navigation software, games, camera function control, navigation software, and phone or a wide variety of other software and functional interfaces can be provided. In some embodiments, multiple different applications can be provided on a single mobile device 10, and in some of those embodiments, multiple applications can run simultaneously on the mobile device 10.

In some embodiments, the processing unit 112 may comprise a video processing circuit 124 configured to output image data, which may include the graphic content 12, to the screen 14. The video processing circuit 124 may comprise a graphics processing unit (GPU) 126. The GPU 126 may comprise specialized circuitry configured to manipulate the graphic content 12 including the first portion 28 and/or the second portion 30. The GPU 126 may be configured to access the first graphic library 24 and the second graphic library in the memory 114. The GPU 126 may comprise one or more integrated circuits and/or processing cores that are directed to mathematical operations commonly used in graphics rendering. Additionally, the GPU 126 may be configured to implement various operations, such as blitting, texture mapping, pixel shading, frame buffering, and the like.

The memory 114 may correspond to a dedicated memory (e.g. RAM, ROM, Flash, etc.) and may further include a non-transient, computer readable medium such as electronic memory or other storage medium such as hard disk, optical disk, flash drive, etc., for use with the processing unit 112. For example, an operating system may be stored in the storage medium and provide for the mobile device 10 to control and manage system resources, enable functions of application software, and interface application programs with other software and functions of the mobile device 10.

The I/O interface 116 may correspond to a variety of interfaces configured to provide communication to and from the processing unit. For example, the I/O interface may correspond to one or more of a variety of I/O interfaces including but not limited to PCIe ports, SATA interface ports, Intel® QuickPath Interconnect® (QPI) ports, USB 2.0, USB 3.0, or Thunderbolt™ interfaces (10 Gbps), Firewire, Fire800, Express Card, serial memory interfaces, etc. As discussed herein the user interface 22 may correspond to a touch screen interface incorporated in the screen 14. The user interface 22 may also correspond to various buttons, switches, joysticks, sliders, knobs, connected peripherals, etc.

The mobile device 10 may further comprise an antenna 128 coupled to a wireless communication circuit 130. The communication circuit 130 may include a radio frequency transmitter and receiver for transmitting and receiving signals via the antenna 128. The radio signals may be configured to transmit data and may correspond to various communications protocols. The communication circuit 130 may be configured to operate in a mobile communications system and may be used to send and receive data and/or audiovisual content. Receiver types for interaction with a mobile radio network and/or wireless broadcast network may include GSM, CDMA, WCDMA, GPRS, MBMS, WiFi, WiMax, DVB-H, ISDB-T, etc., as well as advanced versions of these standards that may be developed at a later time.

The mobile device 10 may further include a sound signal processing circuit 132 for processing audio signals transmitted by and received from the communication circuit 130. Coupled to the sound processing circuit 132 are a speaker 134 and a microphone 136 that enable a user to listen and speak via the mobile device 10. The communication circuit 130 and sound processing circuit 132 are each coupled to the processing unit 112 so as to carry out overall operation of the mobile device 10. Audio data may be passed from the processing unit 112 to the sound signal processing circuit 132 for playback to the user. The audio data may include, for example, audio data from an audio file stored in the memory 114 and retrieved by the processing unit 112, or received audio data such as in the form of audio data from a remote server. The sound processing circuit 132 may include any appropriate buffers, decoders, amplifiers, etc.

The mobile device 10 also may include a position data receiver 138, such as a global positioning system (GPS) receiver. The mobile device 10 also may include a network adapter 140, such as an infrared transceiver and/or an RF adapter or transceiver (e.g., a Bluetooth adapter or transceiver). In this configuration, the mobile device 10 and the communication system 10 may be configured to communicate various forms of information and data. Additionally, the mobile device 10 may comprise a power source 142 configured to supply power for the various processors, circuits, and related operations discussed herein.

The mobile device 10 may further be coupled to a camera system 144, which may include a controller, such as a digital signal processor (DSP). The functions of the DSP may be controlled by the processing unit 112. The camera system 144 may further include a sensor (e.g., a charged-coupled device or CCD) configured to image a field of view as determined by imaging optics of the camera system 144. A light meter may detect illumination conditions in the field of view and a flash may provide supplemental illumination during the capture of image data.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Accordingly, it is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A mobile device comprising:
    an inertial measurement unit (IMU) configured to measure inertial motion data;
    a magnetic field detector configured to measure directional data;
    a display screen configured to display graphic content, wherein the display screen is configured to receive a user input and quantify the user input as user motion; and
    a processing unit communicatively coupled to the IMU, the magnetic field detector, and the display screen, wherein the processing unit is configured to:
        monitor the directional data;
        in response to directional data exceeding a predetermined threshold, process the graphic content based on the inertial motion data;
        control the graphic content in response to the user motion; and
        display the graphic content on the display screen demonstrating a graphic motion controlled based on the inertial motion data and the user motion, wherein the graphic motion is controlled such that the user motion received from the user interface is prioritized over the inertial motion data during a temporal period.

2. The mobile device according to claim 1, wherein the prioritization comprises controlling the graphic motion of the graphic content in response to the user motion during the temporal period.

3. The mobile device according to claim 1, wherein the prioritization comprises suppressing the control of the graphic motion of the graphic to the inertial motion data during the temporal period.

4. The mobile device according to claim 1, wherein the inertial motion data comprises axial rotation data for a plurality of axes of rotation of the mobile device.

5. The mobile device according to claim 4, wherein processing the dimensional data based on the inertial motion data comprises manipulating the graphic content to rotate proportional to the axial rotation data.

6. A mobile device comprising:
    an inertial measurement unit (IMU) configured to measure inertial motion data, wherein the inertial motion data comprises axial rotation data for a plurality of axes of rotation of the mobile device;
    a magnetic field detector configured to measure directional data;
    a display screen configured to display graphic content; and
    a processing unit communicatively coupled to the IMU, the magnetic field detector, and the display screen, wherein the processing unit is configured to:
        monitor the directional data;
        in response to directional data exceeding a predetermined threshold, process the graphic content based on the inertial motion data, wherein processing the dimensional data of the graphic content based on the inertial motion data comprises manipulating the graphic content to rotate proportional to the axial rotation data; and
        display the graphic content on the display screen demonstrating a graphic motion controlled based on the inertial motion data.

7. The mobile device according to claim 6, wherein the display screen is configured to receive a user input and quantify the user input as user motion.

8. The mobile device according to claim 7, wherein the processing unit is further configured to:
    control the graphic content in response to the user motion.

9. The mobile device according to claim 8, wherein the processing unit is further configured to:
    control of the graphic content such that the user motion received from the user interface is prioritized over the inertial motion data during a temporal period.

10. The mobile device according to claim 9, wherein the prioritization comprises controlling the graphic motion of the graphic content in response to the user motion during the temporal period.

11. The mobile device according to claim 9, wherein the prioritization comprises suppressing the control of the graphic motion of the graphic to the inertial motion data during the temporal period.

12. A method for displaying graphic content on a mobile device, the method comprising:
    measuring inertial motion data via an inertial measurement unit (IMU) configured to measure inertial motion data;
    measuring directional data via a magnetic field detector;
    receiving a user input and quantifying the user input as user motion via a display screen configured to display graphic content; and
    via a processing unit:
        monitoring the directional data;
        in response to directional data exceeding a predetermined threshold, processing the graphic content based on the inertial motion data;
        processing the graphic content in response to the user motion; and
        displaying the graphic content on the display screen demonstrating a graphic motion controlled based on the inertial motion data and the user motion, wherein the graphic motion is controlled such that the user motion received from the user interface is prioritized over the inertial motion data during a temporal period.

13. The method according to claim 12, wherein the prioritization comprises controlling the graphic motion of the graphic content in response to the user motion during the temporal period.

14. The method according to claim 13, wherein the prioritization comprises suppressing the control of the graphic motion of the graphic to the inertial motion data during the temporal period.

15. The method according to claim 12, wherein the inertial motion data comprises axial rotation data for a plurality of axes of rotation of the mobile device.

16. The method according to claim 15, wherein processing the dimensional data based on the inertial motion data comprises manipulating the graphic content to rotate proportional to the axial rotation data.

* * * * *